Nov. 7, 1972  E. MÜLLER ET AL  3,702,150
SLICING MACHINE AND CLAMPING DEVICE THEREFOR
Filed Dec. 14, 1970

*Inventor:*
Ernst Müller
Albrecht Maurer

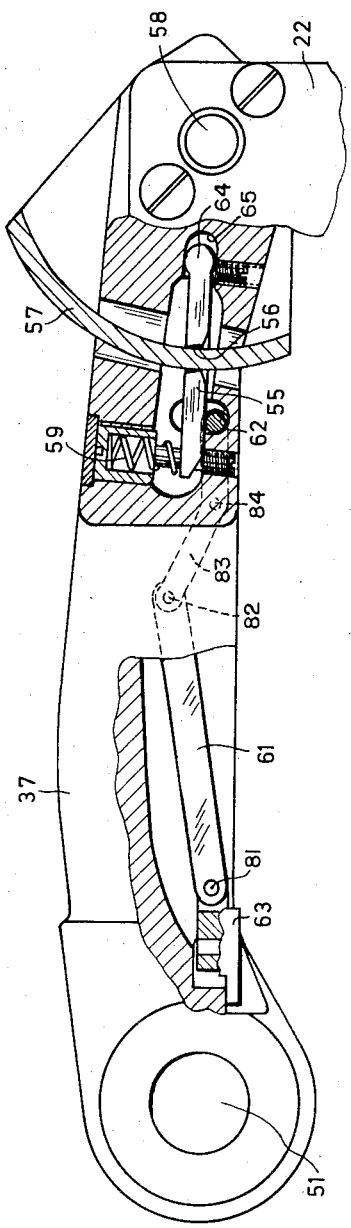

United States Patent Office 3,702,150
Patented Nov. 7, 1972

3,702,150
SLICING MACHINE AND CLAMPING
DEVICE THEREFOR
Ernst Müller and Albrecht Maurer, Balingen, Germany, assignors to Bizerba-Werke Wilhelm Kraut KG, Balingen, Wurttemberg, Germany
Filed Dec. 14, 1970, Ser. No. 97,920
Claims priority, application Germany, Dec. 13, 1969, P 19 62 666.5
Int. Cl. B26d 4/00
U.S. Cl. 146—102 R
2 Claims

ABSTRACT OF THE DISCLOSURE

A slicing machine has a rotating circular blade mounted on a machine housing. Carriage means are mounted on the machine housing for holding a material to be sliced adjacent the blade and for reciprocating movement in a direction parallel to the plane of the blade. A clamping device is mounted on the carriage means for holding a material to be sliced. This clamping means has a pivotally mounted holder provided with gripper pins arranged on a side facing the carriage to selectively hold long pieces of material to be sliced, and has a plurality of gripper hooks retractably mounted on a side of the holder facing the plane of the blade to selectively hold short pieces of materials to be sliced. When long pieces are held, the holder rests on top of the piece of material to be sliced, and when short pieces of material are held the holder rests flush against the carriage and abuts an end surface of the material.

BACKGROUND OF THE INVENTION

The present invention relates to a slicing machine for material to be sliced having a carriage for holding the material to be sliced and disposed on a machine housing so as to be movable in a direction back and forth relative to a rotating circular blade, and a clamping device for the material to be cut which is disposed on the carriage.

The known slicing machines have the disadvantages that their clamping device for the material to be sliced permits only relatively long pieces of material—for example, luncheon meat loaves—to be clamped-in. If short pieces of luncheon meat are to be sliced, a special, added device must be fastened to the clamping device to grip the short pieces at their surface facing away from their diameter and hold them firmly. This supplemental device requires a special storage place when not in use, and its attachment to and disattachment from the clamping device requires a relatively long time; which is annoying, particularly when long and short pieces are to be alternatingly sliced in a continuous succession.

SUMMARY OF THE INVENTION

It is an object of the present invention to eliminate the above-mentioned disadvantages and to provide a clamping device for the material to be sliced which is so designed that with a single device both long pieces, which may be even longer than the carriage, and short pieces may be clamped in without the need for the attachment and/or removal of a supplement device.

This is accomplished, according to the present invention, in that the clamping device comprises a pivotal holder which is provided with gripper pins at its underside facing the carriage for holding long pieces to be sliced, and which, for holding short pieces to be sliced, is provided with gripper hooks on its side surface facing the blade. The hooks can be retracted into a housing when not being used.

In a preferred embodiment of a slicing machine according to the present invention, the holder is mounted on a bearing lever whose position is continuously variable in a plane perpendicular to the surface on which rests the material to be sliced and which can be blocked against upward movement by canting a clamping plate on a circular segment. It is of advantage if a handle with a transmission lever is provided to release the disc engaging in the circular segment. The gripper hooks themselves are preferably disposed on shafts which are connected together by gears and can be pivoted by means of a hand lever.

BRIEF DESCRIPTION OF THE DRAWINGS

FIG. 5 is a cross-sectional view of the holder of FIG. 4 with the gripper hooks pivoted in.
FIG. 6 is a partly cut away, cross-sectional view of a blocking device for the clamping device according to the present invention.

DESCRIPTION OF THE PREFERRED EMBODIMENTS

Figure 1:
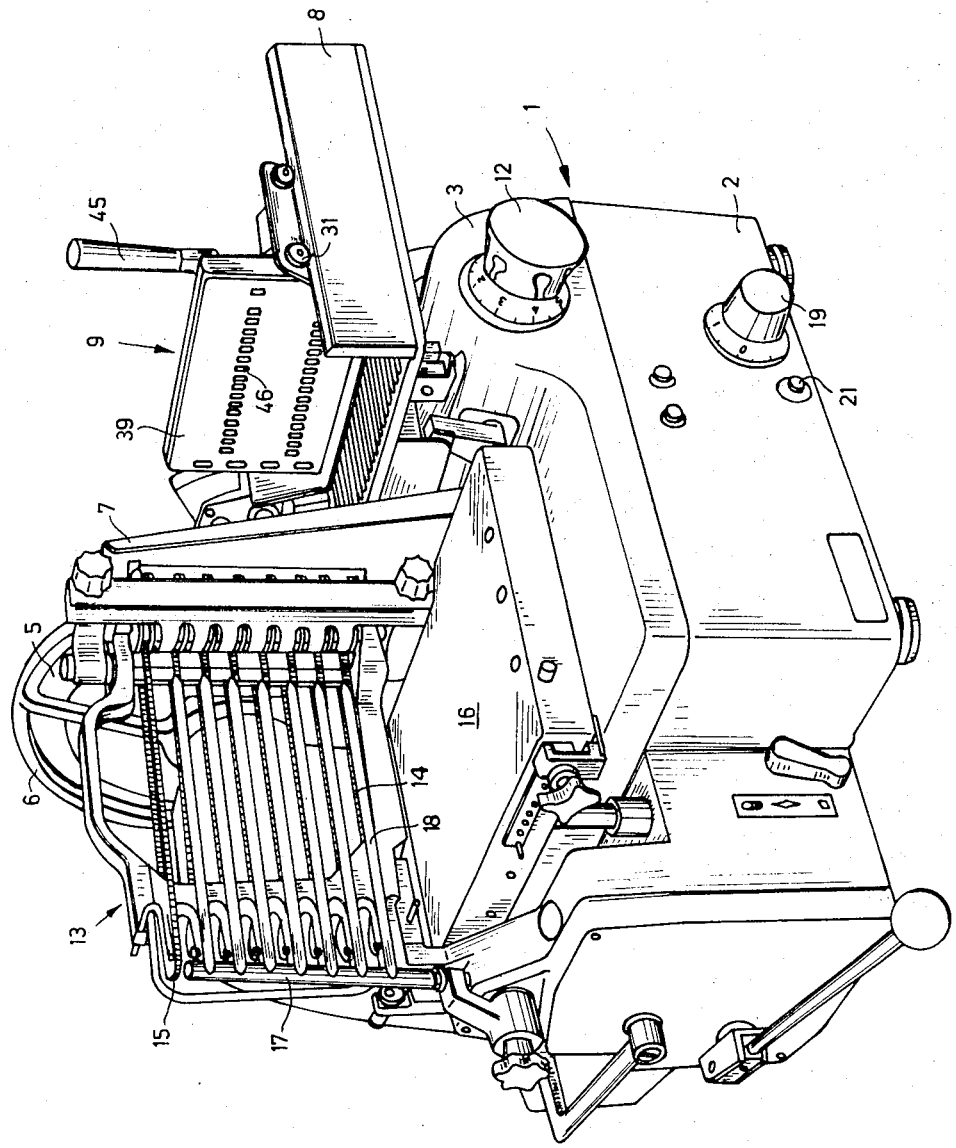
FIG. 1 is a front perspective view of a slicer according to the present invention.

The portions of the slicing machine shown in FIG. 1 that are not set out in detail herein are more fully disclosed in applicants' commonly owned copending application filed Dec. 7, 1970 and entitled "Slicing Machine," and based on German Application P 19 61 069.6 filed in Germany on Dec. 5, 1969.

A circular blade 5 is mounted on a housing 1 (FIG. 1) of two sections 2 and 3. Blade 5 is driven in a known manner by a motor not shown and rotates in a vertical plane. The cutting edge of the circular blade 5 is covered in the area not used for slicing by a stationary protective ring 6 which is mounted on housing section 3 in a known manner. The cutting area of blade 5 is shielded against unintentional contact by a protective bar 7 which is adjustable in dependence on the desired slice thickness. A carriage 8 for holding the material to be sliced is disposed on housing section 3 so that it can be moved back and forth, or reciprocated, in a direction parallel to the plane of the circular blade 5—in FIG. 1 this is from the right front to the left rear. The drive for carriage 8 is disposed in housing section 2. A clamping device 9 for the material to be cut 11, such as a loaf of luncheon meat (FIG. 2), is disposed on carriage 8 and is displaceable in a direction transverse to the direction of movement of carriage 8.

The clamping device 9—which will be discussed in detail below—is driven in some manner not of interest here on carriage 8 in a direction perpendicular to the direction of movement of carriage 8, so that after a slice has been sliced off, the material 11 is advanced by the predetermined thickness of one slice. That is, it is advanced with each reciprocating movement of the carriage 8 toward the left in FIG. 1. With the subsequent carriage movement, the next slice can be sliced at the same predetermined thickness as the previous slice. The thickness of the cut slices can be infinitely set by a control member, such as a knob 12, over a range of, for example about 0.1 to 10 mm. The preferred range is from about 0.5 to 8.5 mm. A slice conveying device 13 is disposed on the side of the circular blade 5 which is opposite to the carriage 8. This device consists in a known manner of a plurality of superimposed endless chains 15 provided with horizontally, outwardly extending pins 14. In front of and below the conveying device 13 a stacking table 16 is provided. The conveying device 13 has associated to it a known kicker 17. Cantilever mounted members 18, which in their rest position lie between chains 15, are attached to kicker 17. The operation of the slicer which has been generally described above will now be discussed. The material 11 is arranged on the carriage 8 by means of the clamping device 9 in a manner which will be discussed below. After setting the desired slicing thickness by the knob 12, a main switch (not shown) is actuated to cause the circular blade 5 to rotate. Now button switch 21 is pressed so that carriage 8 commences its reciprocating movement. With each movement of carriage 8, slice is sliced from the material 11 by the circular blade 5. After each cut, the clamping device 9 advances the material 11 in the direction toward the blade 5 by a distance corresponding to the thickness of one slice. The cut slices pass between blade 5 and protective bar 7, to be gripped by the tips 14 of chains 15 and then move in a perpendicularly suspended position to the members 18 of kicker 17. The slices are knocked from this position by the kicker 17, which at a suitable moment performs a sudden downward pivoting movement, and land on the stacking table 16 where they are stacked into a stack.

The clamping device 9 (FIGS. 2 and 3) has a guide block 22 which is displaceably mounted on a rod 23 connected to carriage 8, and which is guided by two rollers 24 engaging fixed rail 25 which is provided on carriage 8. A follower member 26 connected to guide block 22 displaceably and releasably engages into a screw 27 which is driven in steps with each movement of the carriage 8 and advances the guide block 22 each time in the direction toward the plane of the circular blade 5 by an amount corresponding to the set slice thickness. The member 26 may be moved out of engagement with the screw 27 by pivoting a lever 30 approximately 180°, so that the clamping device 9 can be, for example, manually reciprocated with respect to the circular blade 5. A cam 33 (FIG. 2) is connected with the lever 30 to turn therewith and adjust a lever 34 when lever 30 is pivoted. Lever 34 itself moves, by means of its lever arm opposite cam 33, the member 26 out of screw 27. Member 26 is biased toward screw 27 by a suitable, known spring 35. For manually finely adjusting the clamping device with respect to the circular blade 5, a knob 36 (FIG. 3) is provided on screw 27 with which screw 27 can be manually turned, for example, when the material to be sliced is first clamped-in.

A support member 29 is releasably attached to guide block 22 by means of a suitable, known clamping screw 28—which is fastened together within block 22 by screw threads—and constitutes a part of the clamping device 9. This support 29 is displaceably guided along the edge of carriage 8 by means of two rollers 31. The support 29 is provided with, preferably, two or more rows of mutually offset, upwardly extending gripper pins 32, which have pointed tips and which penetrate into the material 11 when it is placed on support 29.

The clamping device 9 further has a holder 38 having a housing 39 pivotably connected to guide block 22 and at whose underside is attached a series of downwardly directed, pointed gripper pins 41. These gripper pins 41 penetrate from the top into the material 11, which may be a piece of meat or the like, when material 11 is being clamped-in, so that the meat or other material to be sliced is held firmly between the gripper pins 32 and 41 and under the weight of holder 38 and can be advanced on the carriage 8 in a direction toward the plane of the circular blade 5.

Figure 3:
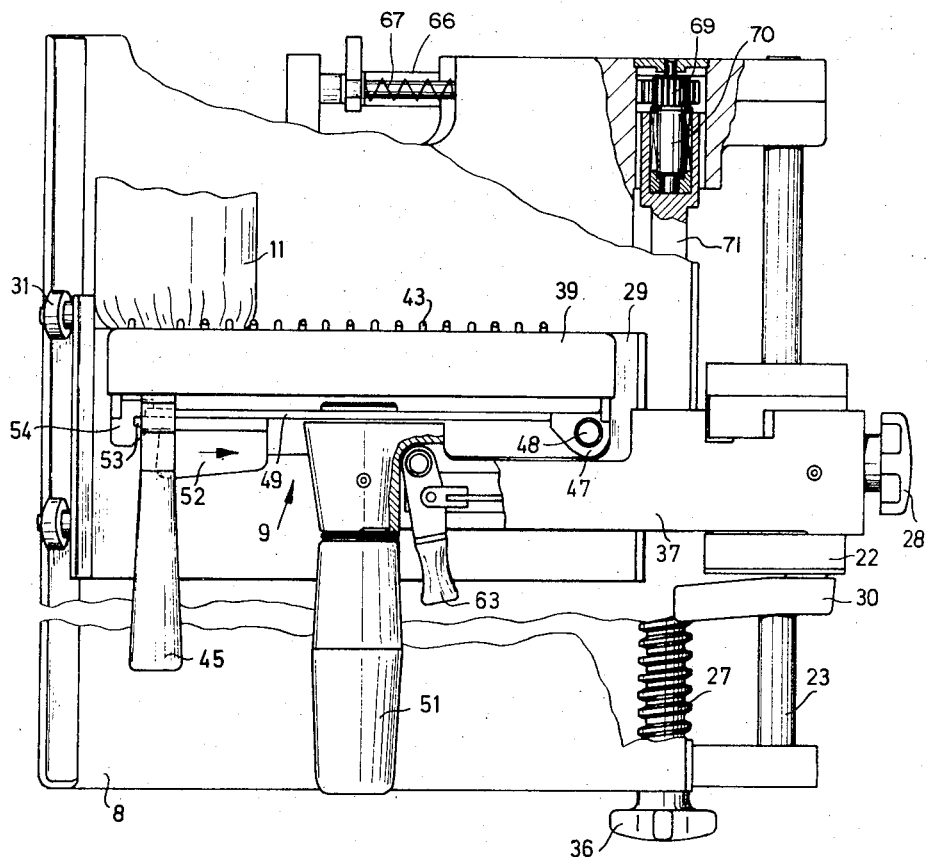
FIG. 3 is a partly cut away, top plan view of the carriage with its clamping device.
Figure 4:
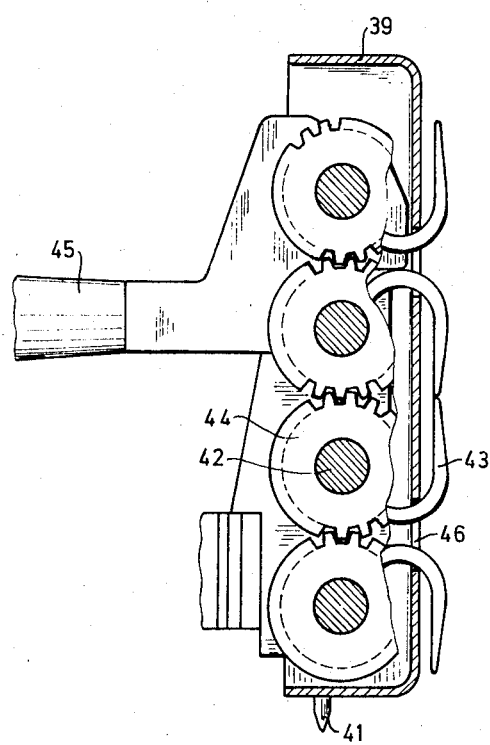
FIG. 4 is a cross-sectional view of a holder for the clamping device having gripper hooks which may be pivoted out.
Figure 5:
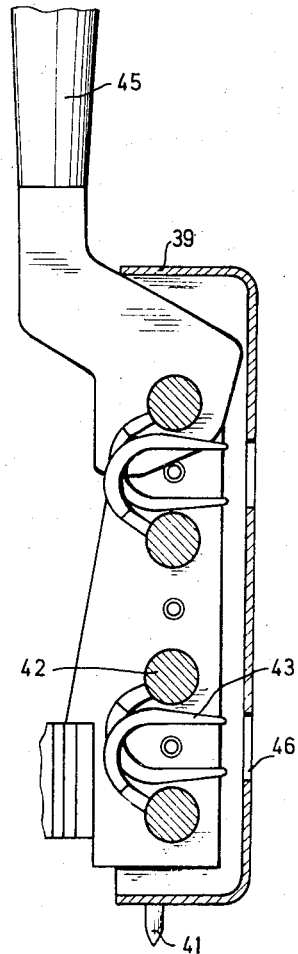

Four shafts 42 (FIGS. 4 and 5) are rotatably mounted in housing 39 in a known manner and are provided with a plurality of gripper hooks 43. The ends of shafts 42 are provided with meshing gears 44. Hooks 43 are mounted in opposite relationship on adjacent shafts, because adjacent shafts will rotate in opposite directions. The uppermost shaft 42 is rigidly connected with a handle 45 which when pivoted upwardly about 90° (FIG. 5) causes the gripper hooks 43 to be simultaneously pivoted in or retracted, through openings 46 defined in housing 39. FIG. 4 shows hooks 43 in their extended position. This is accomplished with the aid of the meshing gears 44 which cause all of the shafts 42 to rotate. The gripper hooks 43—as can be seen in FIG. 3—serve to clamp in relatively short pieces of material 11: the hooks 43 penetrating from the rear into the backside of the material 11 and hold the latter so that it is moved on the carriage toward the plane of the circular blade 5 when the clamping device 9 is advanced toward the plane of the circular blade 5.

Holder 38 is firmly pushed onto a bearing pin 48 by means of an eye-defining ear 47 (FIG. 3) which is rigidly connected with housing 39. The bearing pin 48 extends upwardly from a supporting angle-bracket 49. The bracket 49 is mounted on a support lever 37 to be pivotal in a vertical plane. Lever 37 is mounted on guide block 22 to be pivotal in a vertical plane, and bracket 49 can be lifted or lowered by means of a handle 51. A latch 52 is attached to holder 38 to lock the holder 38 to the bracket 49. Latch 52 is pretensioned toward a tongue 54 by a suitable known spring not shown and is displaceable in the direction of the arrow in FIGS. 2, 3. It engages in a groove 53 (FIG. 3) defined in a tongue 54 of housing 39. By moving latch 52 in the direction of the arrow, the lock can be released and holder 38 can be pivoted on pin 48 and lifted off of the support 29.

A clamping plate 55 (FIG. 6) is arranged in lever 37 for pivotal movement about a bulge 64 in a slot 65 and encloses a circular annular segment 57 while defining a sharp-edged slit 56. The center of the circular segment 57 coincides with the axis of rotation 58 of the lever 37. The clamped plate 55 is clamped together with at least one edge of slit 56 on circular ring segment 57 under the action of a suitable, known spring, such as helical coiled spring 59 and thus blocks lever 37 against upward movement, so that the holder 38—which is connected with lever 37—securely rests on the material 11. By actuating a linkage, 61, which is also arranged in lever 37 and engaging at pin 62 against the underside of clamping plate 55, by means of a pivotally mounted handle 63 (FIG. 3) the clamping plate 55 is moved upwardly against the bias of spring 59 and the clamping effect is cancelled, so that the lever 37, and with it holder 38, can be moved freely upwardly by handle 51.

Figure 2:
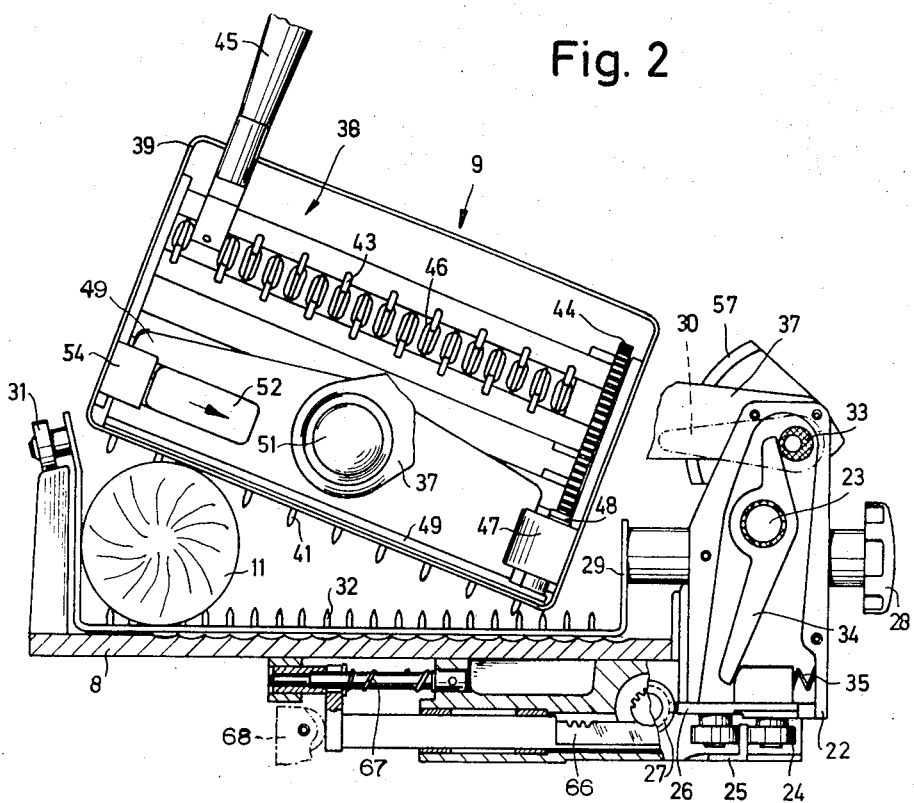
FIG. 2 is a partly cut away, cross-sectional view of the slicing material carriage with a clamping device according to the present invention as seen from the right side of the machine of FIG. 1.

A rack 66 (FIGS. 2 and 3) is mounted below carriage 8 to be slidably displaceable with respect thereto, and is biased into its starting end position—the position shown in FIG. 2—by, for example, a suitable helical coiled spring 67. When carriage 8 is returned to make a slicing stroke—this return is toward the left in FIGS. 2 and 3—rack 66 moves with carriage 8 until rack 66 contacts an abutment lever 68. Once rack 66 contacts lever 68, rack 66 is restrained from moving further to the left in FIG. 2 and displaced from the position shown in FIG. 2 when carriage 8 moves relative to rack 66; the bias of spring 67 being overcome and spring 67 being deflected. A pinion 69 is rotatably mounted on carriage 8 for movement therewith, and now is also displaced relative to rack 66, with which pinion 69 is arranged to engage. Thus, the relative displacement between rack 66 and carriage 8 causes pinion 69 to be rotated an angular distance which is a function of the set slice thickness. Abutment lever 68 is adjustable as a function of the set slice thickness in a manner not shown, and its position determines the angular displacement of pinion 69. Pinion 69 is connected to guide block 22 through a suitable, known overrunning clutch 70 which engages in this direction, shaft 71, screw 27, and follower member 26. In this manner, the clamping device 9 is advanced toward the plane of the blade 5 by an amount corresponding to one slice thickness on each return stroke of carriage 8. When carriage 8 is moved in the opposite direction, or to the right in FIGS. 2 and 3, the rack 66 returns to its starting end position under the bias of spring 67. Screw 27 and shaft 71 will remain at rest during this stroke of carriage 8—the cutting stroke— because clutch 70 does not engage in this direction and pass the rotation of pinion 69 onto shaft 71.

As seen from FIG. 6 the linkage 61 is pivotally connected on its one end to handle 63 (FIG. 3) at 81 and on its other end to a toggle lever 83 at 82. The toggle lever 83 is pivotally mounted at 84 in lever 37 and carries on its free arm the pin 62. By moving the linkage 61 in FIG. 6 to the left the toggle lever 83 is tilted and the pin 62 moves the clamping plate 55 upwardly.

The main advantage of the present invention is that it is possible with one and the same clamping device to clamp in long pieces of material to be sliced—which may even be longer than the carriage 8—as well as short pieces. When long pieces are to be sliced (FIG. 2) the clamping device 9 is brought into its end position away from the circular blade 5. After releasing the clamping plate 55 by moving handle 63 to the left in FIG. 3, the lever 37 is pivoted upwardly at handle 51, the material to be sliced 11 is placed on support 29, and the underside of holder 38 is pressed against the material 11 by pivoting lever 37 downwardly, until the material 11 is fixed in place between support 29 and holder 38 by gripper pins 32, 41. When short pieces of material to be sliced (FIG. 3) are clamped in, the pieces 11 are pressed against the side of housing 39 which is facing the plane of the circular blade 5 while the gripper hooks 43 are in a retracted position. By pivoting handle 45, the gripper hooks 43 are pivoted through openings 46, penetrate the material to be cut and thus clamp it to housing 39. The holder 38 is flush with support 29 in this instance.

It will be understood that the above description of the present invention is susceptible to various modifications, changes and adaptations, and the same are intended to be comprehended within the meaning and range of equivalents of the appended claims.

We claim:
1. A slicing machine, comprising, in combination:
   (a) a rotating circular blade;
   (b) a machine housing;
   (c) a carriage means mounted on said housing adjacent said blade for reciprocating movement in a direction parallel to the plane of said blade; and
   (d) a clamping means mounted on said carriage means for holding a material to be sliced, said clamping means including:
      (1) means defining a surface on which rests the material to be sliced,
      (2) a supporting lever mounted at one end on said clamping means for continuous pivotal movement about a pivot point in a plane perpendicular to said surface, said supporting lever having a circular ring segment arranged coaxially with the pivot point of said supporting lever, and further including a clamping plate defining a sharp-edge slit which is arranged with respect to said circular ring segment to lock said supporting lever against movement away from said surface, and
      (3) a holder pivotally mounted on, and supported from, the other end of said supporting lever to operatively position said holder with respect to said surface, said holder being provided with gripper pins arranged on a side facing said carriage means to selectively hold long pieces of material to be sliced, and said holder having a plurality of gripper hooks retractably mounted on a side facing the plane of said blade to selectively hold short pieces of material to be sliced.
2. A slicing machine as defined in claim 1, further including linkage means having an actuating handle for engaging said clamping plate and releasing said supporting lever for movement way from said surface.

References Cited
UNITED STATES PATENTS

| 1,479,962 | 1/1924 | Hand et al. | 146—217 |
| 1,702,064 | 2/1929 | Thomas | 146—217 |

FOREIGN PATENTS

| 320,701 | 10/1929 | Great Britain | 146—217 |

WILLIE G. ABERCROMBIE, Primary Examiner

U.S. Cl. X.R.
146—217